March 24, 1942.　　J. C. FOSTER ET AL　　2,277,096
FLUID BRAKE
Filed April 7, 1941　　2 Sheets-Sheet 1
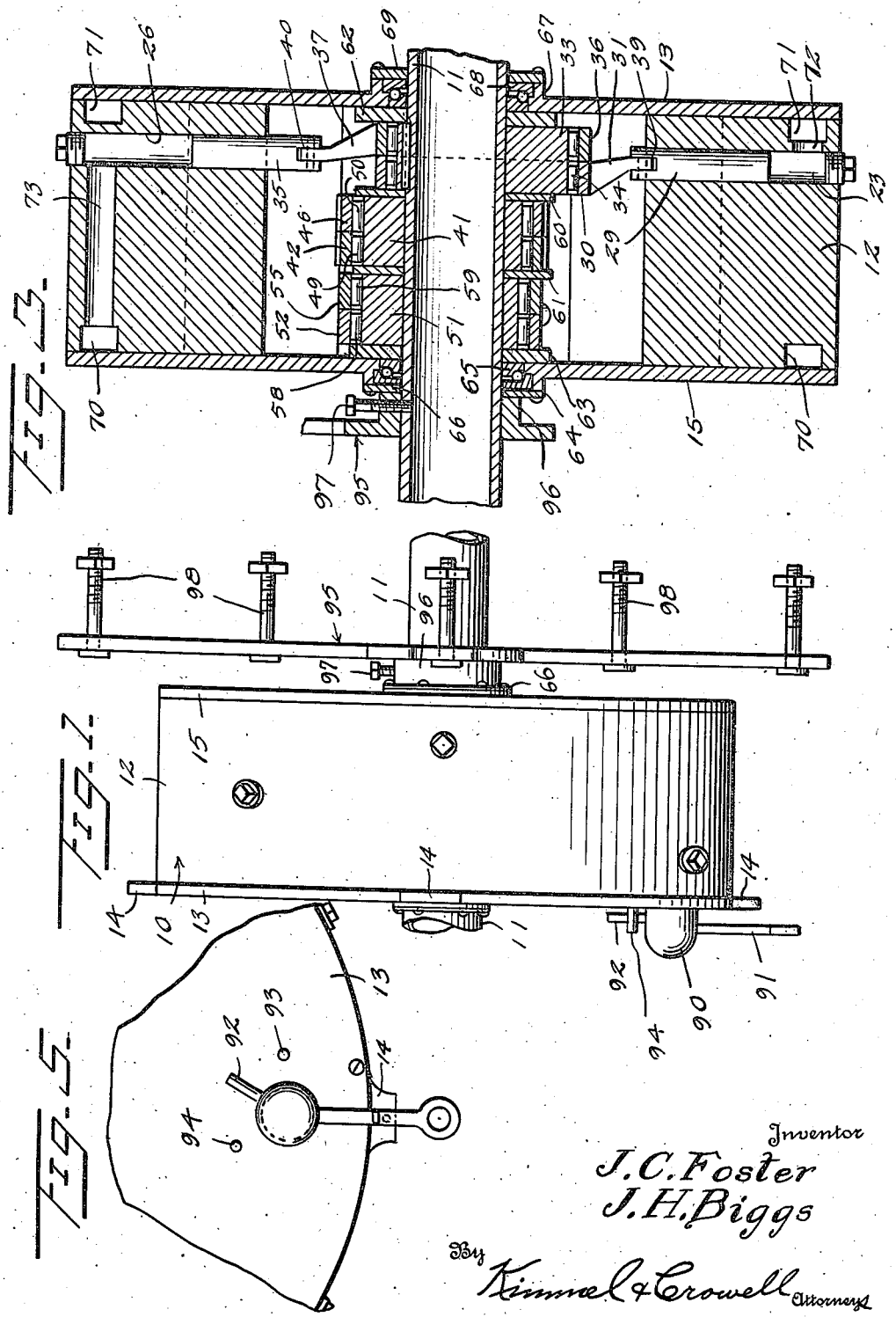
Inventor
J.C.Foster
J.H.Biggs
By Kimmel & Crowell Attorneys

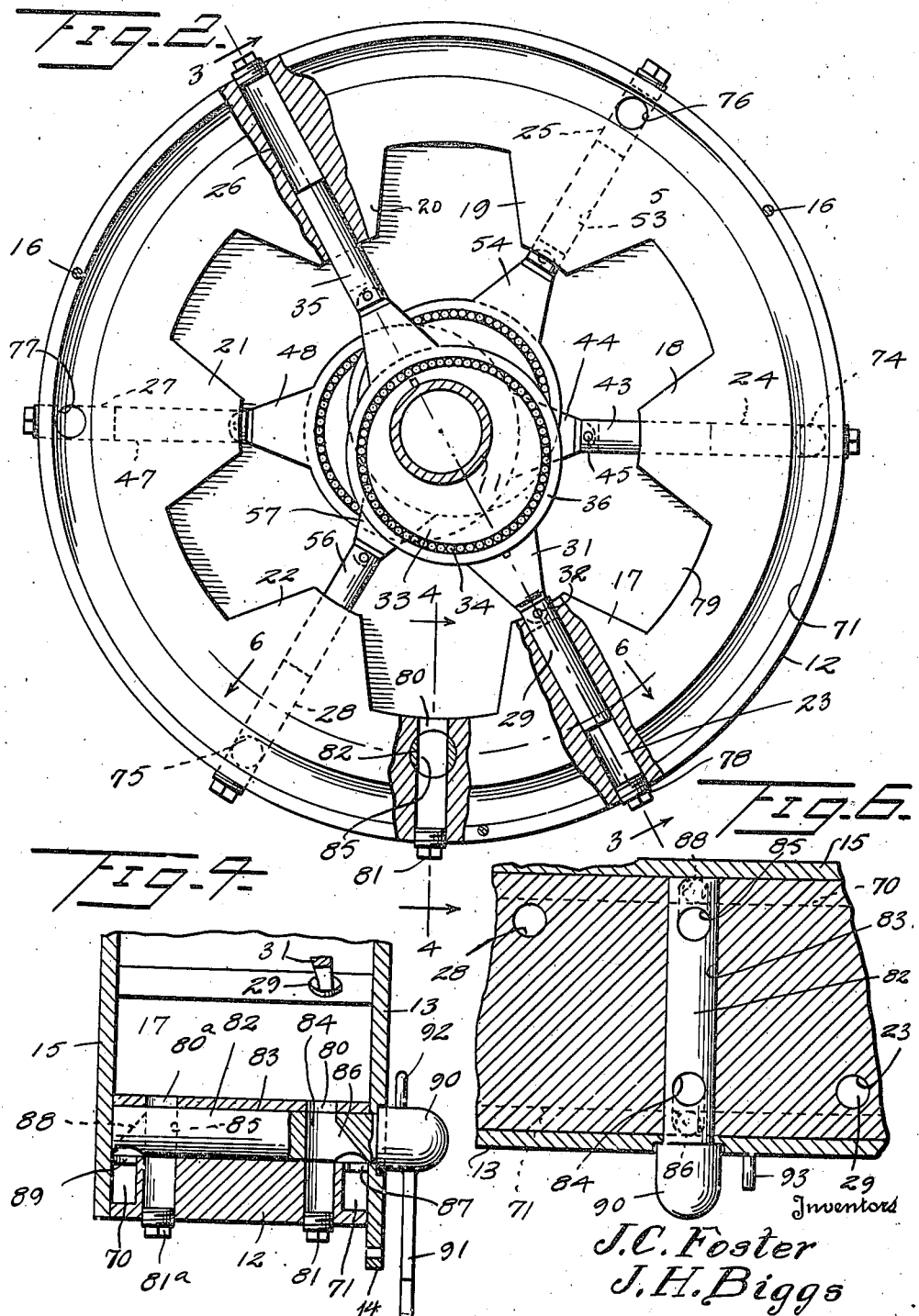

Patented Mar. 24, 1942

2,277,096

UNITED STATES PATENT OFFICE 2,277,096

FLUID BRAKE

John Clyde Foster and John Henry Biggs, Odessa, Tex.

Application April 7, 1941, Serial No. 387,298

5 Claims. (Cl. 188—99)

This invention relates to braking devices and more particularly to a fluid brake.

An object of this invention is to provide a brake structure for connection with a rotatable member, such as a vehicle wheel, wherein the rotation of the wheel or rotatable member provides the motive force for the braking fluid.

Another object of this invention is to provide a fluid brake including a housing with a plurality of reciprocating pistons therein, the housing being filled with a fluid, such as oil or the like, and the housing having a closed fluid path intercepted by a controlling valve for regulating the flow of the fluid in said path.

A further object of this invention is to provide a fluid brake wherein the braking action may be effected smoothly and positively and without any frictional contact between a stationary and a movable element.

A further object of this invention is to provide a fluid brake embodying a minimum of parts so that structure is greatly simplified and may be strongly constructed to withstand the strains to which the brake may be subjected.

A further object of this invention is to provide a brake structure of this kind wherein the strain on the wheel shaft may be evenly distributed about the shaft as the brake is applied.

To the foregoing objects and to others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

In the drawings:

Figure 1 is a detail side elevation of a fluid brake constructed according to an embodiment of this invention;

Figure 2 is a detail end elevation, partly broken away, of the brake with the outer wall of the housing removed;

Figure 3 is a sectional view, taken on the line 3—3 of Figure 2;

Figure 4 is a sectional view taken on the line 4—4 of Figure 2;

Figure 5 is a fragmentary inner end elevation of the housing showing the controlling valve; and Figure 6 is a sectional view taken on the line 6—6 of Figure 2.

Referring to the drawings the numeral 10 designates generally a housing structure which is adapted to be mounted on a rotatable shaft 11, the shaft 11 being rotatable with respect to the housing 10 and the housing 10 being normally stationary. The housing 10 includes a cylindrical body 12 provided with a rear wall or plate 13 having ears or flanges 14 by means of which the housing 10 may be fixedly secured to a wheel housing or the like so that the housing 10 will be stationary. The body 12, at its outer or forward end, is provided with a cover plate 15 which may be secured to the body 10 by suitable fastening devices 16 or the like. The rear plate or cover 13 may also be secured to the body 12.

The body 12 is constructed in annular or cylindrical form and is provided with a plurality of radially arranged inwardly projecting lugs 17, 18, 19, 20, 21 and 22, on the interior thereof, there being six of these lugs which are equally spaced apart about the shaft 11. The lug 17 has disposed therein a fluid cylinder 23 and the lugs 18 to 22 inclusive also have radially arranged cylinders 24, 25, 26, 27 and 28 respectively. A piston 29 is slidable in the cylinder 23 and is operatively connected with a ring 30 by means of a connecting rod or member 31. The outer end of the connecting rod 31 is pivotally connected as at 32 with the inner end of the piston 29. The ring 30 is rotatably mounted on an annular eccentric 33 which is fixed to the shaft 11 and preferably anti-friction elements 34 are interposed between the ring 30 and the eccentric 33. A diametrically opposed piston 35 is slidable in the cylinder 26 and is operatively connected with a ring 36 mounted on the eccentric 33 outwardly of the ring 30. The piston 35 is connected with the ring 36 by means of a connecting rod 37 which is pivotally secured to the inner end of the piston 35 by means of a pin 38. The inner ends of the pistons 29 and 26 are bifurcated as shown at 39 and 40 respectively and the outer portions of the connecting rods 31 and 37 are disposed between the bifurcations 39 and 40 respectively.

A second eccentric 41 is fixed to the shaft 11, inwardly from the eccentric 33, and a ring 42 is rotatably disposed about the eccentric 41 and is connected with a piston 43 slidable in the cylinder 24 by means of a connecting rod 44. The outer end portion of the connecting rod 44 engages in the bifurcated inner end portion of the piston 43 being pivotally secured to the piston 43 by means of a pin 45. The eccentric 41 also has rotatably mounted thereon a second ring 46 which is connected with a piston 47, slidable in the cylinder 27 by means of a connecting rod 48. Anti-friction elements 49 and 50 are interposed between the rings 42 and 46 respectively, and the periphery of the eccentric 41.

An outer eccentric 51 is fixed to the shaft 11 and a ring 52 is mounted about the eccentric 51 and is connected with a piston 53 slidable in the cylinder 25 by means of a connecting rod 54. A second ring 55 is rotatably mounted on the eccentric 51 and is connected with a piston 56 which is slidable in the cylinder 28 by means of a connecting rod 57. Anti-friction elements 58 and 59 are interposed between the rings 52 and 55 and the periphery of the eccentric 51. The two cylinders 53 and 56 are diametrically opposed with respect to each other.

A spacing washer 60 is interposed between the confronting faces of the outer eccentric 33 and the intermediate eccentric 41 and a second spacing ring 61 is interposed between the eccentric 41 and the eccentric 51. An inner sealing ring or gasket 62 is disposed about the shaft 11 and is interposed between the inner eccentric 33 and the outer wall or plate 13. An outer sealing gasket or ring 63 is interposed between the outer eccentric 51 and the inner side of the outer wall 15. The outer wall 15 may be provided with an annular boss 64 within which an anti-friction thrust bearing structure 65 is adapted to be mounted. A cover or plate 66 may be detachably secured to the boss 64 and covers the anti-friction bearing structure 65. The inner plate 13 is provided with an annular boss 67 within which an anti-friction thrust bearing structure 68 is mounted and the boss 67 is closed by means of a removable cover or plate 69.

The body 12 is provided in the outer face thereof with an annular fluid channel or groove 70 and the inner face of the body 12 is also provided with an annular fluid channel or groove 71. The body 12 is provided with a passage 72 which communicates the cylinder 23 with the fluid channel 71 and the body 12 is also provided with a passage 73 which communicates the cylinder 26 with the annular passage 70.

The cylinder 24 communicates with the annular passage 70 by means of a communicating passage 74 and the cylinder 28 also communicates with the annular passage 70 by means of a passage 75. The cylinder 25 communicates with a passage 71 by means of a passage 76. The cylinder 27 communicates with the passage 71 by a passage 77. The several radial cylinders 23 to 28 inclusive are closed at their outer ends by means of plugs 78 so that these cylinders may be formed from the exterior of the body 12 and subsequently plugged. The plugs in the outer ends of the cylinders also provide a means whereby these cylinders may subsequently be rebored and lapped, if such procedure is necessary.

In order to provide a means whereby the fluid forced outwardly of the several pistons into the annular channels 70 and 71 may be regulated or controlled in its movement from these channels to a central reservoir 79, we have provided a radially disposed opening 80 which communicates at one end with the reservoir 79. In practice there are two openings 80 and 80ª which are spaced apart, being disposed closely adjacent the inner and outer ends of the body 12. These openings 80 and 80ª are preferably drilled through the body 12 from the exterior thereof and plugs 81 and 81ª are threaded into the outer ends of the openings to close the same.

A rotatable valve plug 82 is rotatably disposed in a cylindrical opening 83 which is formed in the body 12 inwardly from the annular channels 70 and 71. The valve plug 82 is provided with a transversely disposed opening 84 which, in one position of the plug 82 is adapted to register with the opening 80. The plug 82 is also provided with a second transversely disposed opening 85 which is adapted to register with the opening 80ª at the same time that the opening 84 registers with the opening 80. The plug 82 is formed with an inclined laterally extending passage 86 which, at one end, communicates with the opening 84 in the plug 82 and at the opposite end communicates with an opening 87 formed in the body 12 and which communicates with the annular channel 70. The plug 82 is also formed with a second laterally extending passage 88 which, at one end, communicates with the opening 85 and at the opposite end communicates with an opening 89 formed in the body 12 and communicating with the annular channel 71. In this manner the reservoir 79 may be placed in communication with the two annular channels 70 and 71 to permit the free movement back and forth of the fluid or, if the valve plug 82 is rotated to either an entirely closed position or partly closed position, the flow of the liquid is either cut off or partly restricted so as to thereby stop or retard the reciprocal movement of the several radial pistons and simultaneously either stop or retard the rotation of the shaft 11 and the wheel connected therewith. The valve plug 82, at its outer end, is provided with a head 90 and an arm 91 is fixed to the head 90 and is adapted to be connected to a suitable brake operating pedal through conventional linkage or the like. A pin 92 is fixed relative to the head 90 and is movable between a pair of stop members 93 and 94 which are fixed to the inner plate 13.

A spider 95 which is provided with a hub 96 is fixed, by means of a set screw 97, to the shaft 11. The spider 95 is adapted to be fixed by means of attaching bolts 98 to the vehicle wheel so that the spider 95 will rotate with the wheel and the shaft 11 will also rotate therewith.

In the use and operation of this brake structure the housing 10 is adapted to be fixed by suitable fastening devices engaging through the ears or flanges 14 to the wheel housing or a stationary part associated with the vehicle. The spider 95 is adapted to be bolted or otherwise secured to the wheel and the valve operating arm or lever 91 is connected to a suitable pedal or brake operating structure. During the normal operation of the vehicle the valve plug 82 will be in the position shown in Figure 4 wherein the fluid from the reservoir 79 may flow through the openings in the valve plug 82 into the outer annular channels 70 and 71. The cylinders are arranged in opposed pairs and one cylinder of each pair communicates with one annular channel where the other cylinder communicates with the other annular channel. The valve plug 82 provides a means common to both annular channels for establishing communication between these channels and the inner fluid reservoir 79. In the event it is desired to operate the brake structure for stopping or retarding rotation of the wheel connected with the shaft 11, the valve plug 82 may be moved to the desired partly closed or entirely closed position. In a partly closed position the valve plug 82 will restrict the flow of the liquid from the channels 70 and 71 to the reservoir 79 and thus retard the reciprocation of the several pistons. In the event it is desired to apply the maximum braking force on the shaft 11 the valve plug 82 may be moved to a completely closed position, in which position the valve plug 82 will lock the liquid in the channels 70 and 71 and also in the several pistons which are moving outwardly at that time. The three eccentrics are disposed with the long radii thereof substantially 120 degrees apart so that when the braking force is applied to the shaft 11 this force will be applied equally about the housing 12 and the shaft 11. As shown in Figure 2, the piston 29 is at the limit of its outward movement so that the liquid in the cylinder 23 ahead of the piston 29 has already been forced into the annular channel 71. The opposed piston 35 is at the limit of its inward movement and has drawn in the full capacity or quantity of liquid into the cylinder 26 from the annular channel 70. It will be obvious that when the valve plug 82 is moved to either a partly or completely closed position the outward movement of the liquid from the cylinder 23 will be either retarded or completely cut off and the inward movement of the liquid in the cylinder 26 will be either retarded or completely cut off. At the same time that the piston 29 is at the limit of its outward movement, the piston 53 and the piston 47 are also at the limit of their outward movement and the piston 43 and piston 56 are at the limit of their inward movement in the same manner as the piston 35.

A brake structure constructed according to this invention will operate without any friction occurring between the stationary portion thereof and the rotatable portion and due to the simplicity of this brake structure it will not readily get out of order and will be able to withstand the strains to which the device may be subjected.

What we claim is:

1. A fluid brake comprising a stationary body formed with an internal fluid reservoir and a plurality of radially arranged cylinders, a rotatable shaft journalled in said housing, a plurality of eccentrics fixed to said shaft within said reservoir, a plurality of pistons slidable in said cylinders, a pair of rings rotatable on each eccentric, means connecting one ring of each pair to a piston, means connecting the other ring of each pair to a diametrically opposed piston, said body having a pair of spaced apart annular channels disposed on opposite sides of said pistons, said body also having openings communicating certain of said cylinders with one of said channels and other openings communicating the remaining cylinders with the other of said channels, said body also having means for communicating said channels with said reservoir, and a manually operable valve member engageable with said latter means for controlling the flow of fluid from said channels to said reservoir.

2. A fluid brake comprising a stationary body formed with an internal fluid reservoir and a plurality of radially arranged cylinders, a rotatable shaft journalled in said housing, a plurality of eccentrics fixed to said shaft within said reservoir, a plurality of pistons slidable in said cylinders, a pair of rings rotatable on each eccentric, means connecting one ring of each pair to a piston, means connecting the other ring of each pair to a diametrically opposed piston, said body having a pair of spaced apart annular channels disposed on opposite sides of said pistons, said body also having openings communicating certain of said cylinders with one of said channels and other openings communicating the remaining cylinders with the other of said channels, said body having a longitudinal opening inwardly of said channels, a pair of inlet ports communicating said reservoir with said longitudinal opening and a pair of outlet ports communicating the opposite end portions of said longitudinal opening with said channels, and a manually operable valve plug rotatable in said longitudinal opening for controlling the movement of fluid toward or from said reservoir.

3. A fluid brake comprising a stationary body formed with an internal fluid reservoir and a plurality of radially arranged cylinders, a rotatable shaft journalled in said housing, a plurality of eccentrics fixed to said shaft within said reservoir, a plurality of pistons slidable in said cylinders, a pair of rings rotatable on each eccentric, means connecting one ring of each pair to a piston, means connecting the other ring of each pair to a diametrically opposed piston, said body having a pair of spaced apart annular channels disposed on opposite sides of said pistons, said body also have openings communicating certain of said cylinders with one of said channels and other openings communicating the remaining cylinders with the other of said channels, said body having a longitudinal opening inwardly of said channels, a pair of inlet ports communicating said reservoir with said longitudinal opening and a pair of outlet ports communicating the opposite end portions of said longitudinal opening with said channels, and a manually operable valve plug rotatable in said longitudinal opening and provided with a pair of spaced openings selectively registerable with said inlet and outlet ports for controlling the movement of fluid toward or from said reservoir.

4. A fluid brake comprising a stationary body formed with an internal fluid reservoir and a plurality of radially arranged cylinders, a rotatable shaft journalled in said housing, a plurality of eccentrics fixed to said shaft within said reservoir, a plurality of pistons slidable in said cylinders, a pair of rings rotatable on each eccentric, anti-friction elements interposed between said rings and said eccentrics, means connecting one ring of each pair to a piston, means connecting the other ring of each pair to a diametrically opposed piston, said body having a pair of spaced apart annular channels disposed on opposite sides of said pistons, said body also having openings communicating certain of said cylinders with one of said channels and other openings communicating the remaining cylinders with the other of said channels, said body also having means for communicating said channels with said reservoir, and a manually operable valve member engageable with said latter means for controlling the flow of fluid from said channels to said reservoir.

5. A fluid brake comprising a stationary body formed with an internal fluid reservoir and a plurality of radially arranged cylinders, a rotatable shaft journalled in said housing, a spider fixed to said shaft exteriorly of said housing, means for attaching said spider to a wheel, a plurality of eccentrics fixed to said shaft within said reservoir, a plurality of pistons slidable in said cylinders, a pair of rings rotatable on each eccentric, means connecting one ring of each pair to a piston, means connecting the other ring of each pair to a diametrically opposed piston, said body having a pair of spaced apart annular channels disposed on opposite sides of said pistons, said body also having openings communicating certain of said cylinders with one of said channels and other openings communicating the remaining cylinders with the other of said channels, said body also having means for communicating said channels with said reservoir, and a manually operable valve member engageable with said latter means for controlling the flow of fluid from said channels to said reservoir.

JOHN CLYDE FOSTER.
JOHN HENRY BIGGS.